United States Patent [19]
Sanigar

[11] 3,805,025
[45] Apr. 16, 1974

[54] DOCUMENT HANDLING SYSTEMS

[75] Inventor: William George Sanigar, Royston, England

[73] Assignee: International Computers Limited, London, England

[22] Filed: Oct. 16, 1972

[21] Appl. No.: 298,047

[30] Foreign Application Priority Data
Oct. 14, 1971 Great Britain .................... 47758/71

[52] U.S. Cl. .......................................... 235/61.6 H
[51] Int. Cl. .......................................... G11c 19/00
[58] Field of Search .................. 235/61.6 H, 61.6 R; 178/17.5; 340/174.1 J, 174.1 K, 172.5

[56] References Cited
UNITED STATES PATENTS

| | | | |
|---|---|---|---|
| 3,426,179 | 2/1969 | Grimm et al. | 235/61.11 R |
| 3,188,619 | 6/1965 | Hemphill et al. | 235/61.11 R |
| 3,117,307 | 1/1964 | Davie | 340/173 R |

*Primary Examiner*—Thomas J. Sloyan
*Attorney, Agent, or Firm*—Misegades, Douglas & Levy

[57] ABSTRACT

A document handling system is described in which a feed path between a document feed hopper and a reader is capable of carrying a number of documents. The feed hopper is actuated to pass documents on to the feed path normally in a continuous succession in response to read instructions and, in order to maintain an association of a fed document with that read instruction which caused it to be fed, the read instructions are passed into a nesting buffer having a number of stages. The instructions are read from one end of the buffer as the documents from the feed path respectively reach the reader. Thus, the reader always withdraws from the buffer that instruction appropriate to the document that is being read. By making the number of stages of the buffer equal to the number of documents that can be carried concurrently on the feed path it becomes possible to associate a feed-inhibit marker with the first buffer stage, so that if this stage becomes empty as a result, for example, of the exhaustion of read instructions, then feeding is halted. However, the presence of the buffer and the withdrawal of instructions under control of reading ensures that all documents arriving at the reader may be read and correctly associated each with the appropriate instruction.

3 Claims, 1 Drawing Figure

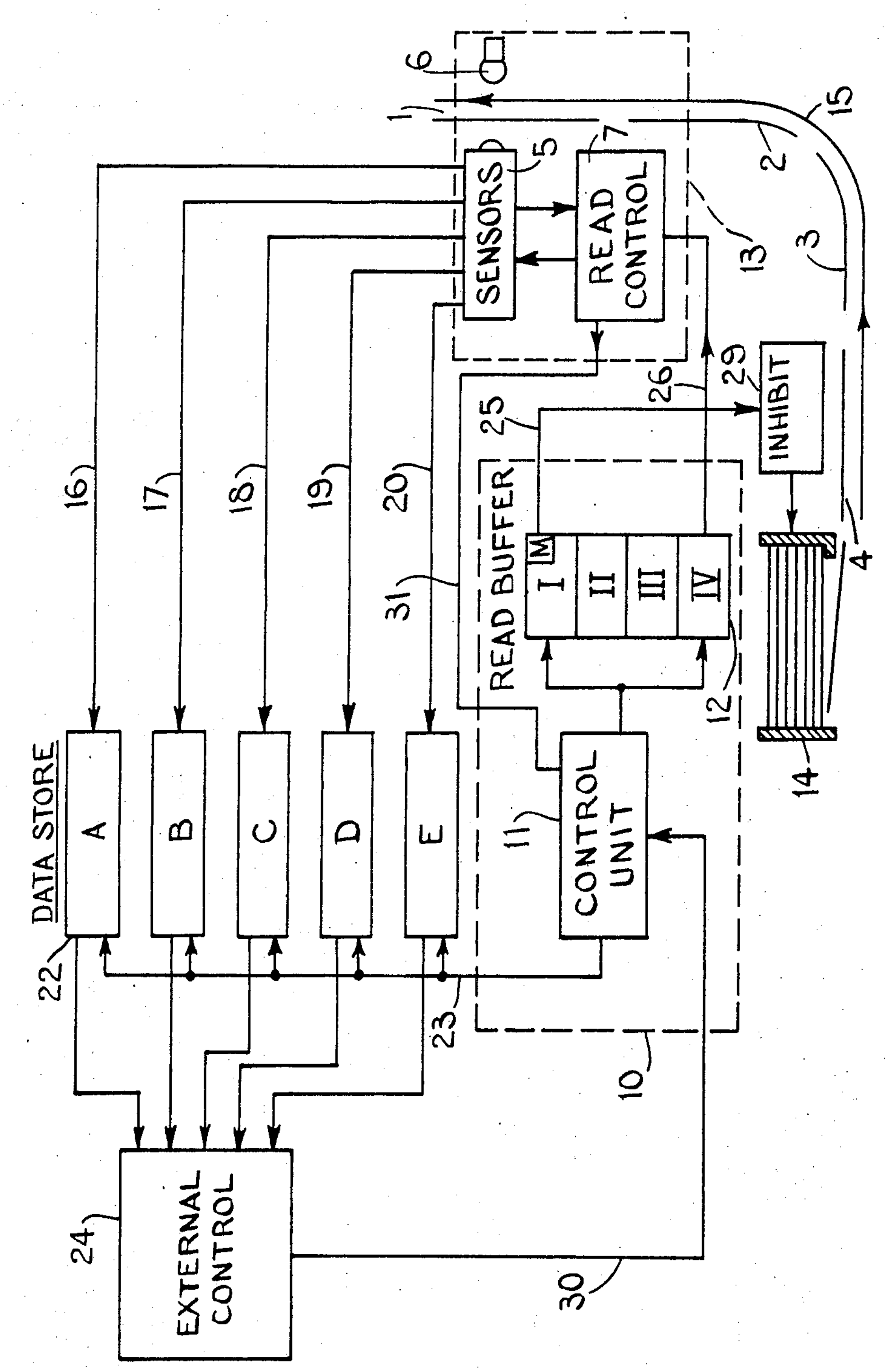
DATA STORE
A
B
C
D
E
SENSORS
READ CONTROL
READ BUFFER
I
M
II
III
IV
CONTROL UNIT
INHIBIT
EXTERNAL CONTROL
1
2
3
4
5
6
7
10
11
12
13
14
15
16
17
18
19
20
22
23
24
25
26
29
30
31

DOCUMENT HANDLING SYSTEMS

BACKGROUND OF THE INVENTION

1. Field of the Invention

The present invention relates to document handling systems.

2. Description of Prior Art

Document handling systems in which documents such as punch cards, bank checks etc. are transported from a feed hopper past a read station and to one or a plurality of document stackers or pockets are well known. Over the years improvements to such systems have resulted in increasing the speed at which documents may be transported. Presently, systems which handle 1,200 – 1,600 documents/minute have been produced and in such systems, a technique of "free flight" document handling is employed. With this technique, several documents are in motion simultaneously while three or four documents may be in motion between the feed hopper and read station at any instant of time.

However, because a document, once fed, is advanced to the reading station independently of a feed-initiating command, there is a requirement for the subsequent identification and re-synchronisation of the reading of data from the document with the remainder of the apparatus. For example, if a feeding instruction is terminated by a control device, several documents will, at that time, already have left the feed hopper en route for the reading station and it is then necessary to ensure that the documents already in flight will be read to prevent the data on such documents from being lost. Even if an indicating device is provided with the read station to detect documents passing the read station unread, the efficiency of the system is reduced by having to locate unread documents and re-running a feed - read - stacking cycle for a few documents.

SUMMARY OF THE INVENTION

According to the present invention, a document handling system includes means operable to feed documents in succession; means for reading documents and a document feed path able to carry a predetermined number of documents in sequence between the feeding means and the reading means; means for generating a succession of reading instructions to be associated respectively each with a different document; a multistage buffer store connected to receive reading instructions and arranged to pass instructions from stage to stage along the buffer from a first to a final stage; means connecting the final stage of the buffer to the reading means to read out the instruction in said final stage to be associated with a document at the reading means and means associated with the buffer to inhibit operation of the feeding means if the buffer contains a predetermined number of instructions corresponding to that number of documents which may be carried concurrently on the feed path.

BRIEF DESCRIPTION OF THE DRAWING

Document handling apparatus embodying the present invention will now be described, by way of example, with reference to the accompanying drawing, which shows diagrammatically a multi buffer arrangement in a document handling apparatus.

DESCRIPTION OF THE PREFERRED EMBODIMENTS

Referring now to the drawing a document reading device is indicated schematically by a document feed hopper 14, a read station 13 and a document feed path 15. The reading device is one of a conventional kind in which, in response to a feed-initiating command a document 1 is presented to the feed path 15 by the feed hopper mechanism 14. The feed path 15 guides the fed document 1 along the path 15 to the read station 13, where data carried by the document is read, and thence to a document stacking arrangement (not shown). The feed path 15 between the hopper 14 and the read station 15 is sufficiently long to accommodate, say, four documents 1–4. The feed hopper is preferably cyclic in action and the application of a continuous feeding signal will cause the repeated feeding of successive documents from the hopper 14 to the path 15. Thus, under these conditions there will be a succession of documents on the path. In the particular arrangement illustrated, because the feed path can accommodate four documents, it will be realised that the first document 1 will reach the reading station 13 at the time when the fourth document is, or is about to be, fed. Document feeding apparatus of this kind is well known in the art and the documents may be transported along the path 15, for example, by pairs of feed rollers, or by jets of air directed from guides forming the path 15.

The reading station 13 consists, for example, of a block 5 of photo-electric sensors activated by a light source 6 to sense items of data carried by-the documents 1–4. The reading station 13 also includes a read control 7 which is arranged to determine when a document is about to be read and to allocate sensed data representations to a required destination, over output lines such as lines 16–20. It is convenient for the indication of the beginning of a reading operation to be provided by an additional sensor in the block 5 positioned, for example, to detect the leading edge of a document on the path 15.

The document reading device is arranged to provide data read from the documents 1–4 to a data processing arrangement having, for example, a control 24 and a data store 22. Associated with the reading device is an auxiliary control unit 11 and a read instruction buffer 12. The buffer 12 is a "push-down" or "nesting" store having a number of stages I – IV, in the present case four, to correspond to the number of documents 1–4 that may be accommodated on the feed path 15 between the feed hopper 14 and the reading stage 13. The buffer 12 is arranged to receive, in stage I, incoming read instructions from the processor control 24 via the control unit 11. An instruction thus entered into the stage I passes downwards as shown in the drawing to the last empty stage, or into stage IV if all stages are empty. A store having a sequence of stages arranged in this way is shown, for example, in U.S. Pat. No. 3,117,307 which shows storage apparatus having three multi-digit data storage registers with transfer stages between adjacent registers operable to pass data along the registers from the first to the last. The transfers of data are automatic and are produced by the operation of control logic using flip-flops as indicators of whether or not any of the registers becomes empty. A data item is inserted into the first register under control of an input signal from an input source and an item is read out of the final register in response to the occurrence of an output signal. It will be apparent that the control 11 will also include the necessary logic network to control the passage of the instructions through the buffer 12. A marker M is included within this network and is shown, for simplicity, associated with stage I of the buffer 12 in the drawing. The marker M is typically an indicator flip-flop as described in the U.S. Patent referred to above, and associated with the stage I to provide an output indication whenever the stage I does not actually contain a read instruction. The output indication is connected to a feed inhibit unit 29 of the document reading device, which may simply be a relay arranged to prevent the operation of the document feeding mechanism, for example.

Output lines 26 from stage IV of the buffer 12 are connected to the read control arrangement 7 of the reading station 13. It will be appreciated that the actual contents of a read instruction will depend upon the manner in which data items sensed from a document is to be dealt with in any particular data processing apparatus. Thus, for example, it may be required that a read instruction shall specify the destination for data from the document, or it may consist of identification information to be compared with, or perhaps combined with, the data from the document. Hence, it will be seen that the manner in which the read control 7 is arranged to deal with the data sensed from the document will be determined by the manner in which the read instruction is intended to be used in the particular processing apparatus concerned. It is frequently required, for example, that all information derived from the sensed documents is distributed over a block of storage locations within the main data store 22 of the processor, and in this case the output lines 16–20 from the block 5 of sensors would be connected to the storage locations A–E of the data store 22. Distribution of the sensed data would then, for example, be controlled by a control line 23 from the control 11. In such a case the output line 26 would not need to carry address - selection data. However, if the read instruction from the stage IV of buffer 12 were required to determine the destination of the sensed data, then the read control 7 in association with the control 11 would be arranged to select the appropriate one of the output lines 16–20 from the sensor block 5.

In operation read instructions are derived from the main control 24 of the data processing arrangement and these instructions are applied, by the control 11 to read buffer 12. The read instructions are 'stacked' in read buffer 12 by entering each instruction in to the first stage I of the buffer 12, the entered instruction then passing down the buffer 12 into the highest numbered vacant stage. While the first stage I is empty the marker M associated with this stage maintains its signal to the inhibit unit 29 to prevent the feeding of a document. Thus, as the first instruction passes through the first stage I the output inhibit signal is temporarily removed and the feeding of the first document 1 is permitted, the fed document passing into the feed path 15. As succeeding instructions pass into the buffer 12, their passage through the first stage I causes a corresponding document to be fed to the path 15 in a similar manner. Thus, once all the stages I – IV contain instructions the marker M will cease to inhibit feeding and as long as instructions continue to flow into the buffer to maintain it fully loaded, feeding of documents will be continuous. It will also be seen that whenever the buffer is fully loaded there will be as many documents 1–4 passing along the feed path 15 as there are loaded stages in the buffer 12.

As the first document 1 reaches the reading station 13 its presence there is detected and a resultant signal causes the instruction now in stage IV of the buffer to be read out into the read control 7. The reading out of the stage IV causes all the instructions in the buffer 12 to be moved along one stage. If, at this time, no new instruction is entered into stage I, the marker M will again produce the feed inhibit signal to arrest feeding of documents. The detection of the succeeding documents from the feed path 15 by the reading station, however, will cause the reading out from the buffer stage IV of the successive instructions, each being respectively associated with that document which was fed to the feed path 15 on the original entry of the instruction into the buffer 12. Thus, by stacking the necessary read instructions in read buffer 12, the data on documents on the feed path 15 will not be lost because these documents will all have corresponding read instructions subsequently to be reassociated as the documents are read in turn at read station 13. Thus, it will be seen that using the buffer arrangement described, the feed hopper 14 and read station 13 do not need to be synchronised. The detection of an "about to read" condition at the read station 13 enables this station to exercise control over the movement of instructions out of the buffer 12, and provided that there are sufficient stages in the buffer 12 for those read instructions relating to all documents that can possible be on the feed path 15 between the hopper 14 and the read station 13 then each document as it is read will be associated with the correct instruction. At the same time the buffer 12 should preferably have no more stages than are needed for the documents 1–4 on the feed path 15 so that the buffer 12 is enabled to be maintained in a full condition to enable feeding to be continuous for as long as instructions continue to be passed into the control unit 11.

It will be recalled that the manner in which the data read from the documents 1–4 by the reading station 13 is dealt with will depend upon the particular organisation of the data processing apparatus with which the document reading apparatus is associated. It is not unusual for such data to be required for processing unit of a computer and in this case it is frequently proposed to set aside a part of the main data store 22 to act as an input buffer for the processor. Under these conditions the arrangement shown in the drawing may be used and the data which is read at read station 13 is then applied over lines 16 – 20 to corresponding sections A – E of the data store 22. The sensing devices 5 of the station 13 may be sequentially connected by the read control 7 to lines 16 – 20 so that data read from a single document is applied over a particular line to a section of data store 22. For example, the data read from document 1 would be applied over line 16 to section A of data store 22 while data read from document 2 would be applied over line 17 to storage section B. At the same time control signals produced by control unit 11 could be applied over line 23 to cause data stored in sections A – E to be extracted therefrom and read out to the processor through its control 24. Thus, sections A – E may be emptied cyclically by causing control signals on line 23 to address each storage section sequentially. The cyclic control of the selection of the lines 16 –20 and of the extraction of data from the stages A – E of the store 22 may, for example, be obtained by the cyclic energisation of selection lines, the necessary control signals being sequentially applied to the lines by a counter, for example, or any other suitable signal generating means within control unit 11.

It will be realised that because the read instructions are derived from the control 24 of the data processing apparatus, then the overall control of the document reading arrangement stems from this external control 24. Thus, the control 24 would normally be inhibited from requesting reading operations by the generation of read instructions that would result in the overloading of the buffer capacity offered by the store 22 sections A – E. It will also be understood that the overall operation of a processor would be controlled by software in the form of a program of instructions, and that the storage buffer sections A – E and, indeed, the read buffer 12 could be constituted by particular areas of a single data store of the data processing apparatus. Similarly the control 11, although shown as a separate unit for the sake of clarity, could, in fact, form a part of the overall control network of the apparatus.

In alternative modes of operation, it will be realised that the data processing apparatus may require document reading operations in order to pass the data read from the documents to other peripheral devices rather than to use such data directly in its own computations. Equally, the document reading arrangement may itself provide controlling instructions to govern the operation of the apparatus. In such cases the read instructions may, for example, include data, such as addresses to which data read from a document are to be passed. In this case the read control 7 would be arranged to respond to the read instruction derived from the stage IV of read buffer 12 to perform a conventional address decoding operation in order either to select an appropriate output line from the block 5 of sensing devices or, where, for example, the data from the block 5 is applied to a common highway, to select from the instruction address a gating network to guide the output data from block 5 to the required utilization device. Equally the address data may alternatively be included in the data read from the document, in which case the address data may be routed to a decoding network to derive the requisite address while the other read data is delayed and then passed to the required destination. The delay may be arranged either by the inclusion of delay elements in the data path or by distributing the data initially to a buffer storage arrangement such as the stages A – E of the data buffer 22. The address data would then be used to determine the destinations required for data read out of the store 22.

It is also to be understood that while the arrangement has been described as preferably having just sufficient stages I – IV in the read buffer to accommodate a separate read instruction for as many documents as may be on the feed path 15 at any time, it is possible to extend this number of stages to form, for example, a queue of instructions. The marker M would then be associated with an intermediate stage such that the number of stages between the marker and the exit end of the buffer store would be sufficient to accommodate those instructions corresponding to documents on the feed path. It is also necessary to ensure, by means of an interlock, that even where a string of read instructions is able to be generated without interruption, the feeding of documents is inhibited sufficiently early so that if, say, the output data buffer store from the reading station 13 is becoming full, there remains yet room to accommodate data read from those documents then actually on the feed path 15. Thus, there is a balance between the rate at which data is read from the output buffer and the number of documents fed (including those on the feed path) and control of the feeding operations may be obtained by using a counter which is, for example stepped in one direction as a data item is read out and in the other direction as a document is fed. If the counter has a capacity equal to the number of documents that may be accommodated on the feed path, then a feed inhibit signal may be generated in response to the counter exceeding this capacity. It will also be realised that this counter may also be used in the modes of operation previously described instead of the marker M to control the inhibition of feeding.

I claim:

1. A document handling system, including
document feeding means operable to feed documents one at a time in succession;
document reading means;
a document feed path between the feeding means and the reading means, the feed path being able to carry a plurality of documents concurrently;
means for advancing documents carried by the feed path from the feeding means to the reading means in the order in which they were fed;
a source of reading instruction representations occurring singly in succession, each separate instruction representation being applicable respectively to a different one of the documents fed by the feeding means;
a nesting buffer store having a plurality of data storage stages corresponding respectively to the plurality of documents which can be carried concurrently on the feed path, each stage being arranged to store a representation of an instruction, the stored instruction representations being shifted stage-by-stage along the buffer from a first to a last stage;
means for entering the instruction representations from the source into the first stage of the buffer;
means responsive to the arrival of a document at the reading means to read out that instruction representation currently in the last stage of the buffer; and
means operable if the buffer contains less instruction representations than said plurality of documents to inhibit operation of said document feeding means.

2. A document handling system as claimed in claim 1, in which the buffer store includes control means having means for advancing each instruction representation entered into the first stage of the buffer along the buffer to that empty stage nearest said last stage.

3. A document handling system as claimed in claim 1, including means associated with the first stage of the buffer for indicating the presence and absence of an instruction representation in said first stage, the means for inhibiting operation of said document feeding means being operable in response to the indication that an instruction representation is absent from said first stage.

* * * * *